(12) United States Patent
Telang

(10) Patent No.: US 9,158,825 B1
(45) Date of Patent: Oct. 13, 2015

(54) SEARCH VALIDITY IN DATA BACKUP SYSTEMS

(71) Applicant: Symantec Corporation, Mountain View, CA (US)

(72) Inventor: Nilesh Telang, Pune Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 164 days.

(21) Appl. No.: 13/673,899

(22) Filed: Nov. 9, 2012

(51) Int. Cl.
*G06F 7/02* (2006.01)
*G06F 17/30* (2006.01)
*G06F 11/14* (2006.01)

(52) U.S. Cl.
CPC ...... *G06F 17/30554* (2013.01); *G06F 11/1448* (2013.01)

(58) Field of Classification Search
CPC ............... G06F 17/30424; G06F 17/30274; G06F 17/30554; G06F 17/30336; G06F 17/30
See application file for complete search history.

(56) References Cited

U.S. PATENT DOCUMENTS

| | | | | |
|---|---|---|---|---|
| 9,026,498 | B2 * | 5/2015 | Kumarasamy | 707/654 |
| 2007/0244865 | A1 * | 10/2007 | Gordon et al. | 707/3 |
| 2009/0089071 | A1 * | 4/2009 | Doornebos et al. | 705/1 |
| 2011/0047177 | A1 * | 2/2011 | McCreight et al. | 707/769 |
| 2011/0246475 | A1 * | 10/2011 | Shelton | 707/741 |

* cited by examiner

*Primary Examiner* — Bruce Moser
(74) *Attorney, Agent, or Firm* — Womble Carlyle Sandridge & Rice LLP

(57) ABSTRACT

A computer-implemented method for performing a search on a data backup system is disclosed, where at least a portion of the method is performed by a computing device comprising at least one processor. The method includes receiving a search query, performing a search of indexed information stored in the data backup system based on the search query, determining non-indexed information stored in the data backup system related to the search query, and returning results of the performing and the determining.

14 Claims, 9 Drawing Sheets

SEARCH VALIDITY IN DATA BACKUP SYSTEMS

BACKGROUND

Conventionally, data backup applications store target images of data from a particular computer system onto a backup server. The target images may be retrieved via the data backup application over communication mediums, and may be written to the backup server. During write cycles, a plurality of options may be available for backup storage. For example, one option may be to index the target images for future searching on the backup server. Generally, not all target images are indexed, and therefore, not all backup data is searchable.

For example, in some data backup systems, users must explicitly request backup image data be indexed. In others, some or all of backup image data is indexed, but only during non-peak computing times to conserve system resources. Still in others, only essential or flagged backup image data is indexed.

It follows then, that if backup image data on any particular data backup system is searched, only a portion of actual information stored may be retrieved. Therefore, if a particular search operation is considered vital, there is no conventional method for increasing the confidence of the returned search results as compared to all available data which cannot be searched.

Therefore, there is a need in the art for a solution which overcomes the drawbacks described above.

SUMMARY OF THE DESCRIBED EMBODIMENTS

According to some embodiments of the present invention, a computer-implemented method for performing a search on a data backup system is provided. The method includes receiving a search query, performing a search of indexed information stored in the data backup system based on the search query, determining non-indexed information stored in the data backup system related to the search query, and returning results of the performing and the determining. At least a portion of the method is performed by a computing device comprising at least one processor. In some embodiments, the search query includes a set of search criteria related to information to be searched and the search criteria comprises an identification of at least one networked device of the data backup system and chronological information. In some embodiments, the chronological information includes a set or range of dates associated with information to be searched. In some embodiments, performing the search includes running a search algorithm configured to analyze indexed information stored in the data backup system.

In some embodiments, determining non-indexed information includes querying a target image set related to the search query, and determining an amount of non-indexed information of the target image set. In some embodiments, determining non-indexed information includes determining an amount of non-indexed information related to the search query. In some embodiments, returning the results includes displaying search results of the indexed information, and displaying a relevancy of the search results. In some embodiments, the relevancy includes at least one of a graphical representation of a ratio of non-indexed information to indexed information, and a numerical representation of the ratio of non-indexed information to indexed information. In some embodiments, returning the results further includes displaying additional information related to the search, the additional information comprising an identification of non-indexed inaccessible information. In some embodiments, returning the results further includes displaying a set of indexing options associated with the non-indexed information. In some embodiments, the set of indexing options includes an indexing cost associated with indexing a portion of accessible non-indexed information.

In some embodiments, the indexing cost includes a value of computational cost associated with indexing the portion of accessible non-indexed information to increase the relevancy of current searches and subsequent searches related to the search query. In some embodiments, the set of indexing options includes an indexing cost associated with indexing all accessible non-indexed information related to the search query. In some embodiments, the indexing cost includes a value of computing cost associated with indexing the portion of accessible non-indexed information to increase a relevancy of current searches and subsequent searches related to the search query. In some embodiments, the method further includes determining an indexing cost associated with indexing a portion of accessible non-indexed information related to the search query. In some embodiments, the method further includes receiving a selection of indexing options related to the indexing cost, and indexing the portion of accessible non-indexed information based on the selection.

According to an additional exemplary embodiment of the present invention, a data backup system is provided. The system includes at least one master server configured to store backup image information and at least one indexing server in communication with the at least one master server. The at least one indexing server is configured to index at least a portion of the backup image information. The system includes a search interface module in communication with the at least one master server. The search interface module is programmed to receive a search query, perform a search of indexed backup image information stored in the at least one master server based on the search query, determine non-indexed backup image information stored in the at least one master server related to the search query, and return results of the performing and the determining.

In some embodiments, the search interface module includes an image data collector module configured to retrieve information related to backup image information stored at the at least one master server and to determine the non-indexed backup image information stored in the at least one master server related to the search query. The search interface module includes an index server data collector module configured to retrieve information associated with the at least one indexing server and to determine an indexing cost associated with indexing a portion of accessible non-indexed backup image information stored in the at least one master server related to the search query. In some embodiments, the search interface module further includes a search operation index validator module configured to return the results of the performing and the determining, and an indexing initiator module configured to initiate indexing of a portion of accessible non-indexed backup image information stored in the at least one master server related to the search query.

According to an additional exemplary embodiment of the present invention, a computer-readable storage medium comprises one or more computer-executable instructions that, when executed by at least one processor of a computing device, cause the computing device to perform a method of search on a data backup system. The method includes receiving a search query, performing a search of indexed information stored in the data backup system based on the search query, determining non-indexed information stored in the data backup system related to the search query, and returning results of the performing and the determining.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, exemplary embodiments of the present invention will be described in detail. According to exemplary embodiments, data backup systems and methods of increasing the identification of relevancy of search results for data backup systems are disclosed. The technical effects and benefits of embodiments include increased confidence in search results of backup image data.

Figure 1:
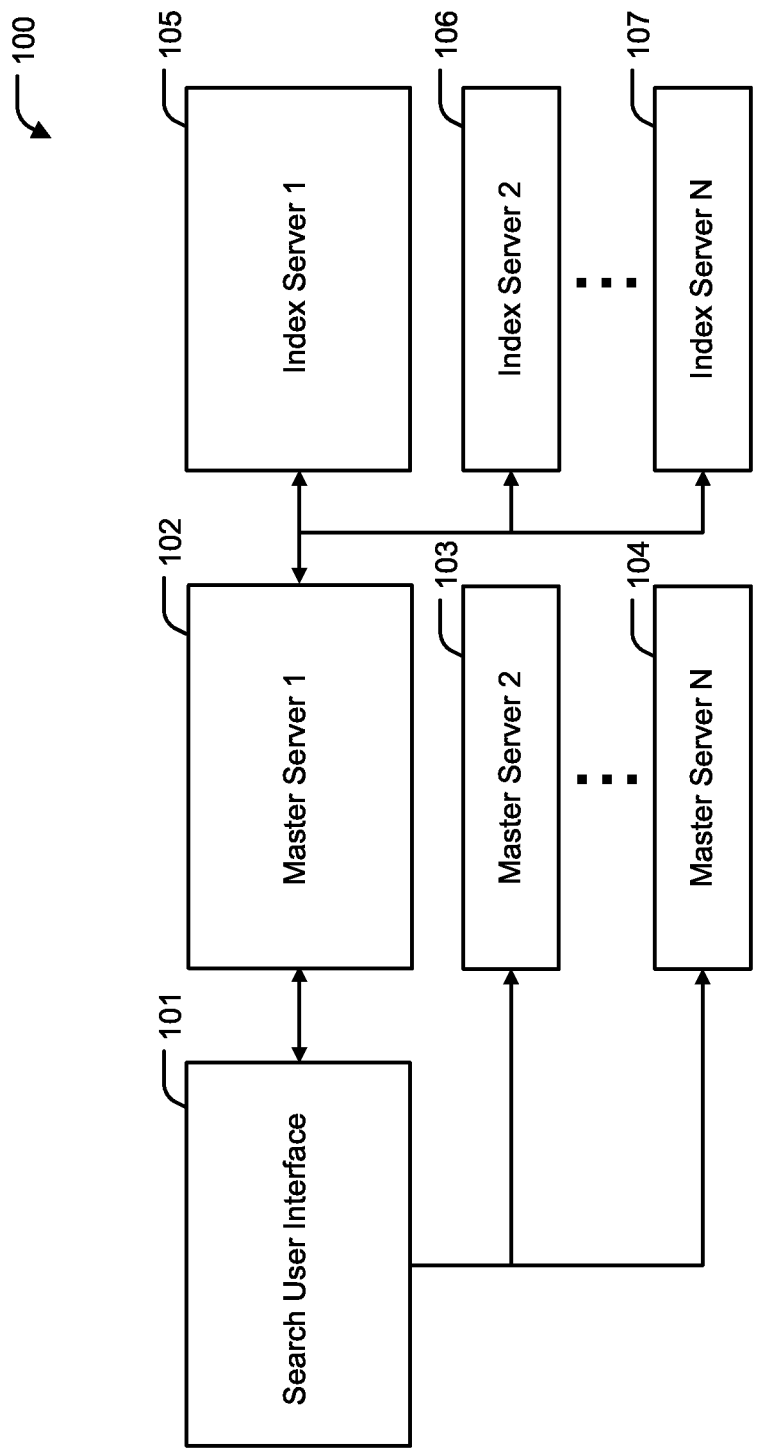
FIG. 1 illustrates a data backup system, according to an exemplary embodiment of the present invention.

Turning to FIG. 1, a data backup system 100 is illustrated, according to an exemplary embodiment of the present invention. The system 100 includes a search user interface (UI) module 101, or UI module 101. The UI module 101 may be a module programmed to perform a plurality of functions related to data searches on the system 100. According to one exemplary embodiment, the UI module 101 is a module programmed to receive a search query, perform a search of indexed backup image information stored in at least one master server based on the search query, determine non-indexed backup image information stored in the at least one master server related to the search query, and return results of the performing and the determining. These and other functions are described more fully with particular reference to FIGS. 2 and 3.

Turning back to FIG. 1, the system 100 further includes a plurality of master servers 102, 103, and 104 in operative communication with the UI module 101. Generally, a master server is a computing device which may be configured to perform a plurality of tasks associated with initiating, controlling, and maintaining a data catalog for backup data stored at the system 100, and for facilitating search requests initiated at the UI module 101. For example, master servers 102, 103, and 104 may be configured to receive and interpret search requests from the UI module 101, and process the same to return a portion of search results for interpretation through the UI module 101. According to one exemplary embodiment of the present invention, the master servers 102, 103 and 104 are NetBackup® Master Servers configured to control a data catalog for a plurality of media servers and clients in communication therewith. According to some exemplary embodiments of the present invention, the master servers 102, 103, and 104 are in operative communication with a storage area network (SAN; not illustrated for clarity of discussion) where one or more media servers are implemented. Generally, the unillustrated media servers are data serving systems containing media (e.g., images)—backed up through system 100.

The system 100 further includes a plurality of index servers 105, 106, and 107 in operative communication with the master servers 102, 103, and 104. Generally, an index server may also be termed an indexing server, and is a computing device which may be configured to perform a plurality of tasks associated with indexing information from the data catalog controlled by the master servers 102, 103, and 104. Indexing information may include creating a database index for data being backed up at system 100. A database index is a data structure that improves the speed of data retrieval operations. Database indexes can be created using one or more columns of a database table. According to one exemplary embodiment of the present invention, the index servers 105, 106, and 107 are configured to index information in a relational database management system for faster retrieval through the use of a search query formatted in structured query language (SQL).

Figure 2:
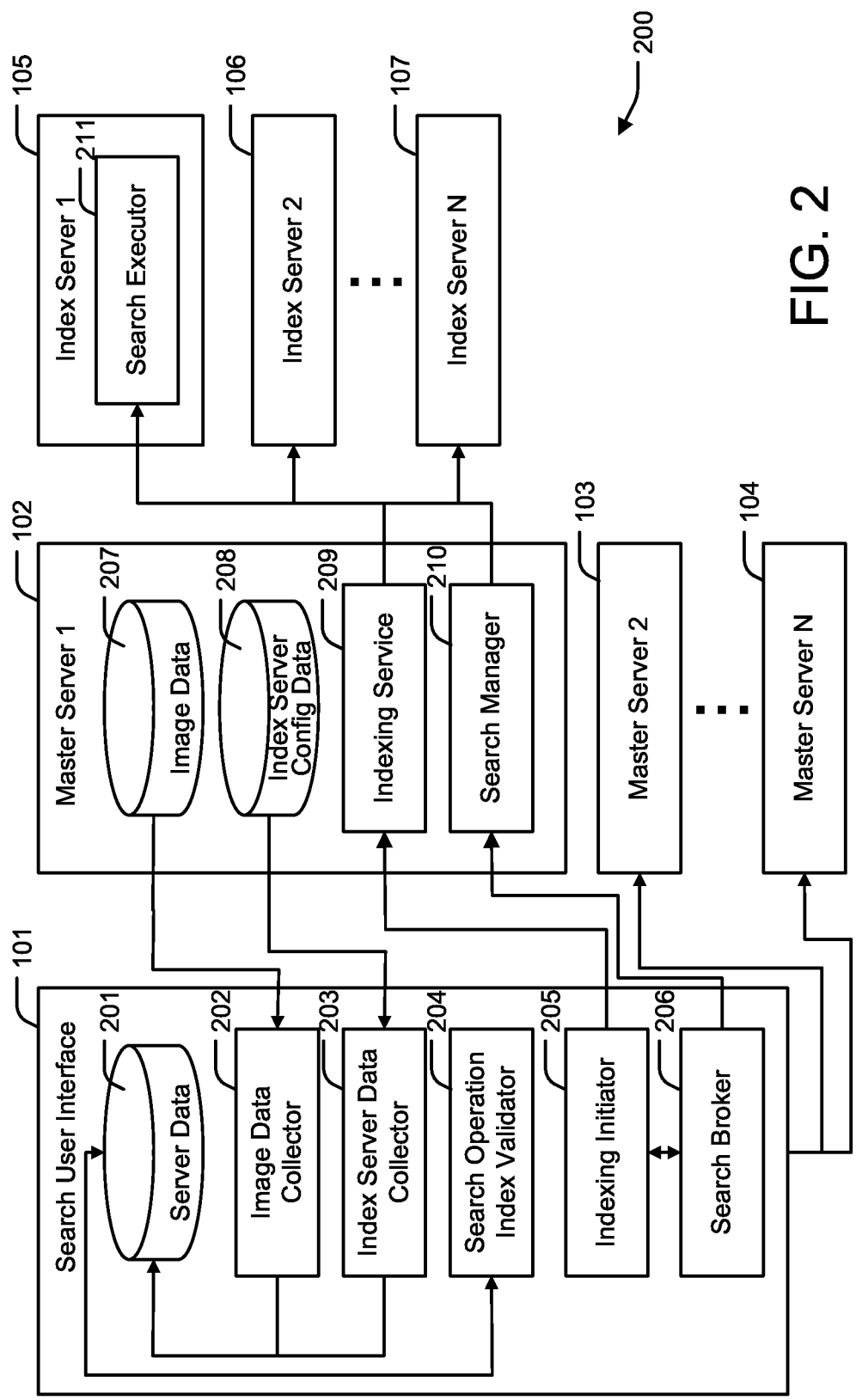
FIG. 2 is a more detailed block diagram of the data backup system of FIG. 1.

Hereinafter, a more detailed description of individual operations of the UI module 101, the master server 102, and the index server 105 is provided with reference to FIG. 2. FIG. 2 is a detailed block diagram of the data backup system 100. As illustrated, the Search User Interface Module 101 includes a plurality of individual components configured to process and handle search requests as described herein. The UI module 101 includes server data store 201 coupled to image data collector 202. The server data store 201 is a data store configured to store image information collected at the image data collector 202 and indexing server information collected at the index server data collector 203. Data stored at server data store 201 may be accessed from within the UI module 101.

The image data collector 202 is a computing component configured to communicate with the master server 102 to retrieve information on all the images backed up by the master server along with associated metadata. The associated metadata may include information including indexing information (i.e., whether or not a particular image is indexed), date information (i.e., date created, date modified, date backed up), image origination information (i.e., which client computer or media server image data originated from), and/or any other suitable or useful information. The image data collector 202 may also be configured to determine, based upon the retrieved metadata, whether or not an image is related to a search query and whether or not the image will be returned in a set of search results (e.g., whether or not the image is indexed). Therefore, the image data collector 202 may retrieve information related to backup image information stored at a master server and determine the non-indexed backup image information stored in the master server related to a search query.

The UI module 101 further includes index server data collector 203 coupled to the server data store 201 and master server 102. The index server data collector 203 is a computing component configured to communicate with master server 102 to retrieve information on all indexing servers configured on the master server along with their properties (e.g., central processing unit cores, memory, etc). Therefore, the index server data collector 203 may retrieve information related to the throughput or computational capacity of index servers in communication with any particular master server.

The UI module 101 further includes search operation index validator 204. The search operation index validator 204 is a computing component configured to, after initiation of a search query or search operation, determine and/or display relevancy of a set of search results. For example, the search operation index validator 204 may access server data from server data store 201, including processed metadata provided from index server data collector 203, to determine an amount of non-indexed information related to a search query. The amount of non-indexed information may be displayed as a percentage, ratio, or other comparison directly correlating to an overall validity of a search operation. For example, if a search operation is related to a particular set of images, and a certain percentage of images are not indexed and therefore not searchable, the validity of that search operation may be determined to be only partially valid.

The search operation index validator 204 may be further configured to return index server information retrieved by the index server data collector 203, and to provide a set of indexing options associated with the index server information. The set of indexing options may include on-demand indexing services based on a computed indexing cost determined at the search operation index validator 204. The UI module 101 further includes indexing initiator 205. The indexing initiator 205, based upon feedback received from the indexing options provided by the search operation index validator 204, initiates indexing operations for on-demand indexing and tracks their progress. The on-demand indexing may be facilitated through communication with an associated indexing service 209 of master server 102.

The UI module 101 further includes search broker 206. The search broker 206 is a computing component facilitating search requests across multiple server domains of the system 100. Therefore, the on-demand indexing provided through indexing initiator 205 may be coordinated across multiple server domains as well. Master server 102 includes image data store 207 and index server configuration data store 208. Image data store 207 is configured to store backup images and associated metadata within the master server 102. Index server configuration data store 208 is configured to store indexing server information for retrieval by index server data collector 202.

The master server 102 further includes indexing service 209. Indexing service 209 is a computing component configured to manage indexing and data hold functionality for indexing servers in communication with master server 102. Therefore, indexing service 209 may facilitate on-demand indexing and data hold operations initiated through UI module 101. Data hold operations may include marking any set or subset of backup images as "held" such that they may not be deleted or modified until an indexing operation is complete.

The master server 102 further includes search manager 210. Search manager 210 is a computing component configured to facilitate communication between UI module 101 and associated search requests to index servers 105, 106, and 107. For example, search manager 210 is in operative communication with search executor 211 on index server 105. Search executor 211 is a computing component configured to run/process search queries for indexed data.

Figure 3:
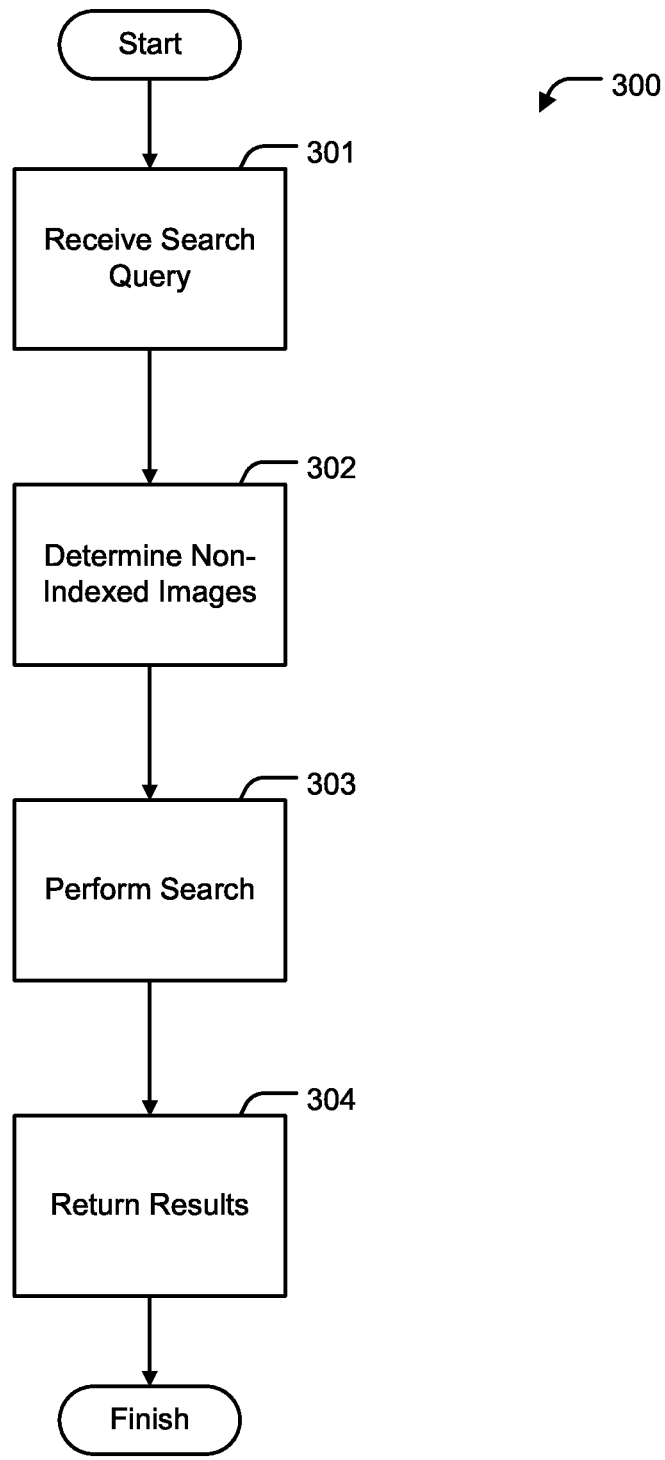
FIG. 3 is a flowchart of a method of searching on a data backup system, according to an exemplary embodiment of the present invention.

Hereinafter, operation of the system 100 is described more fully with reference to FIGS. 3-8, which illustrate a plurality of methods of searching on a data backup system and results returned by the same. FIG. 3 is a flowchart of a method 300 of searching on a data backup system, according to an exemplary embodiment of the present invention. The method 300 includes receiving a search query at block 301. The search query includes a set of search criteria related to information to be searched. For example, according to some embodiments, the search criteria includes an identification of at least one networked device of the data backup system and chronological information. The identification may include a device or client identification, media server identification, or other suitable identification. The chronological information may include a set or range of dates associated with information to be searched, for example, as identified through metadata as described above.

Figure 6:
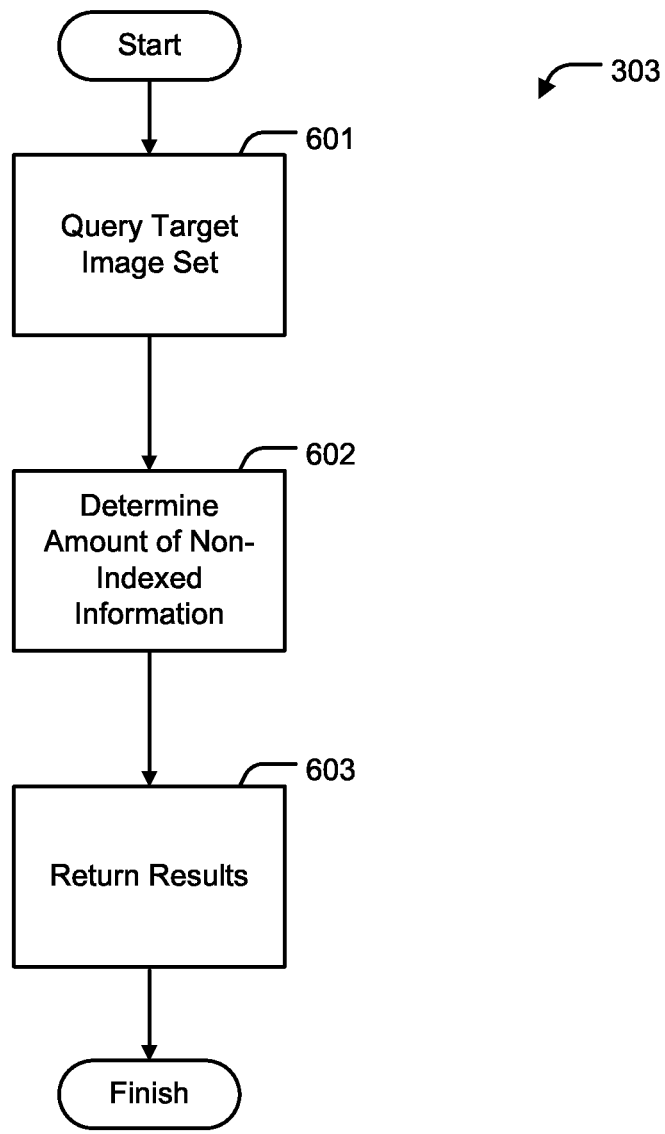
FIG. 6 is a flowchart of a method of determining search results relevancy, according to an exemplary embodiment of the present invention.

The method 300 further includes determining non-indexed information stored in the data backup system related to the search query at operation 302. Determining non-indexed information may include determining an amount of non-indexed information related to the search query as described above, for example, by analyzing metadata to determine an overall amount of information non-indexed related to a particular data range, media server, client computer, or other search criteria. The determining may be a basic determination of search results relevancy to provide an overall percentage of non-indexed information, or may be tailored to provide more detailed information including ratios of particular types of non-indexed information on target image sets of non-indexed information. For example, FIG. 6 is a flowchart providing additional details of operation 302 to determine the relevancy of search results, according to an exemplary embodiment of the present invention. Operation 302 includes querying a target image set related to the search query at block 601, determining an amount of non-indexed information of the target image set at block 602, and returning the associated results at block 603. It should be appreciated that the target image set may be determined based on the search criteria (e.g., date ranges, media server identification, etc). Determining the amount of non-indexed information may include comparing the total information backed up versus total information indexed in some embodiments. These results may be returned to method 300 for further processing.

The method 300 further includes performing a search of indexed information stored in the data backup system based on the search query at block 303. Performing the search may include running a search algorithm configured to analyze indexed information stored in the data backup system. The search algorithm may include any desired search algorithm, including proprietary search algorithms or open-source search algorithms configured to retrieve indexed information based on search criteria.

Turning back to FIG. 3, the method 300 further includes returning results of the performing and the determining at block 304. Returning the results may include a transformation of the search query into useful validity information through displaying search results of the indexed information and displaying a relevancy of the search results. The relevancy may include at least one of a graphical representation of a ratio of non-indexed information to indexed information and a numerical representation of the ratio of non-indexed information to indexed information.

Returning the results may further include displaying additional information related to the search, the additional information including an identification of non-indexed inaccessible information such that further processing may be performed. A set of indexing options associated with the non-indexed information may be displayed such that a user may determine if further processing is appropriate. The set of indexing options may include an indexing cost associated with indexing a portion of accessible non-indexed information. The indexing cost may be a value of computational cost associated with indexing the portion of accessible non-indexed information to increase a relevancy of subsequent searches related to the search query. The indexing cost may also be associated with indexing all accessible non-indexed information related to the search query.

The indexing options, search results, relevancy information, and other suitable information may be presented to a user in a graphical user interface which may be rendered on a host computer, client computer, remote terminal, or other suitable computer apparatus. This displaying may be facilitated through a search results report, for example, as illustrated in FIG. 4.

Figure 4:
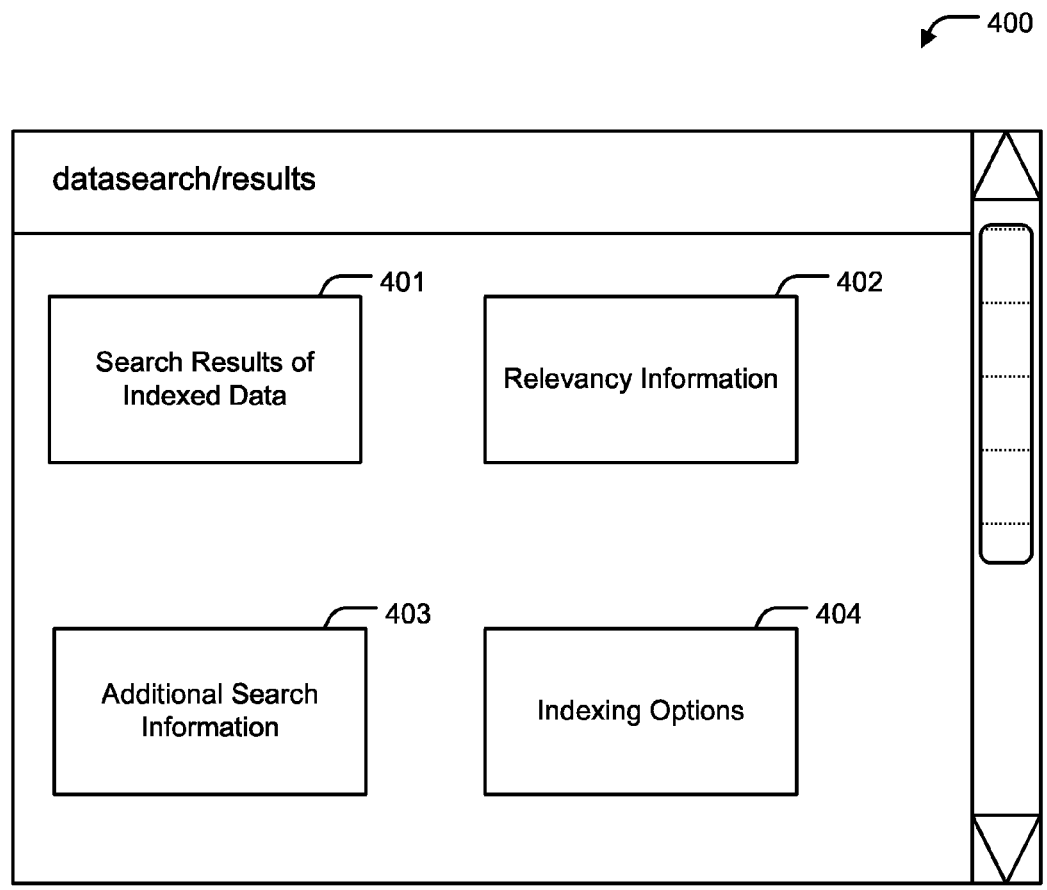
FIG. 4 illustrates a search results report format, according to an exemplary embodiment of the present invention.

FIG. 4 illustrates a search results report 400, according to an exemplary embodiment of the present invention. As shown, the report 400 may be rendered as a user interface, and may include a plurality of information including the search results of indexed data 401, relevancy information 402, additional search information 403, and indexing options 404. As described above, the indexing options 404 may include a set of indexing options including indexing cost for on-demand indexing of non-indexed information to increase the relevancy of search results. The additional search information 403 may include representations of additional search options and identification of non-indexed inaccessible information.

Non-indexed inaccessible information may include information stored in proprietary storage or file formats not immediately discernible through the system 100, or somewhat similar information including but not limited to protected file formats, protected, secured, or encrypted file formats, and any other associated information. It is noted that implementation of decryption algorithms or program access to proprietary file and storage formats may enable this information accessible in some embodiments.

Hereinafter, a method of on-demand data indexing is described with reference to FIG. 5.

Figure 5:
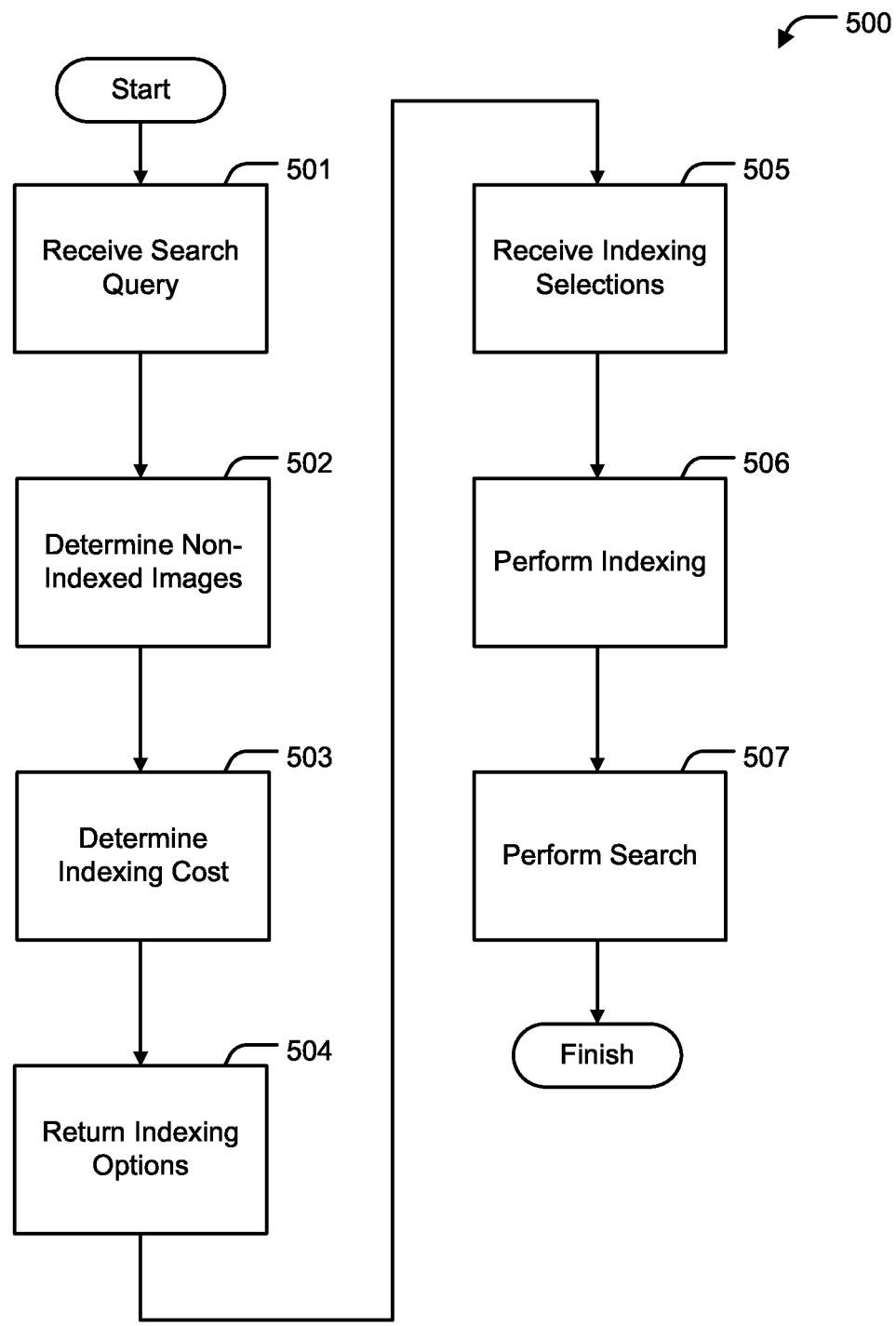
FIG. 5 is a flowchart of a method of on-demand data indexing, according to an exemplary embodiment of the present invention.

FIG. 5 is a flowchart of a method 500 of on-demand data indexing, according to an exemplary embodiment of the present invention. The method 500 includes receiving a search query at block 501. The search query may be substantially similar to the search queries described above, and may include chronological and identification information.

The method 500 further includes determining non-indexed information at block 502. Determining non-indexed information may include determining an amount of non-indexed information related to the search query as described above, for example, by analyzing metadata to determine an overall amount of information non-indexed related to a particular data range, media server, client computer, or other search criteria. The determining may be a determination to provide an overall percentage of non-indexed information, or may be tailored to provide more detailed information including ratios of particular types of non-indexed information on target image sets of non-indexed information. For example, this may include querying a target image set related to the search query and determining an amount of non-indexed information of the target image set.

Figure 7:
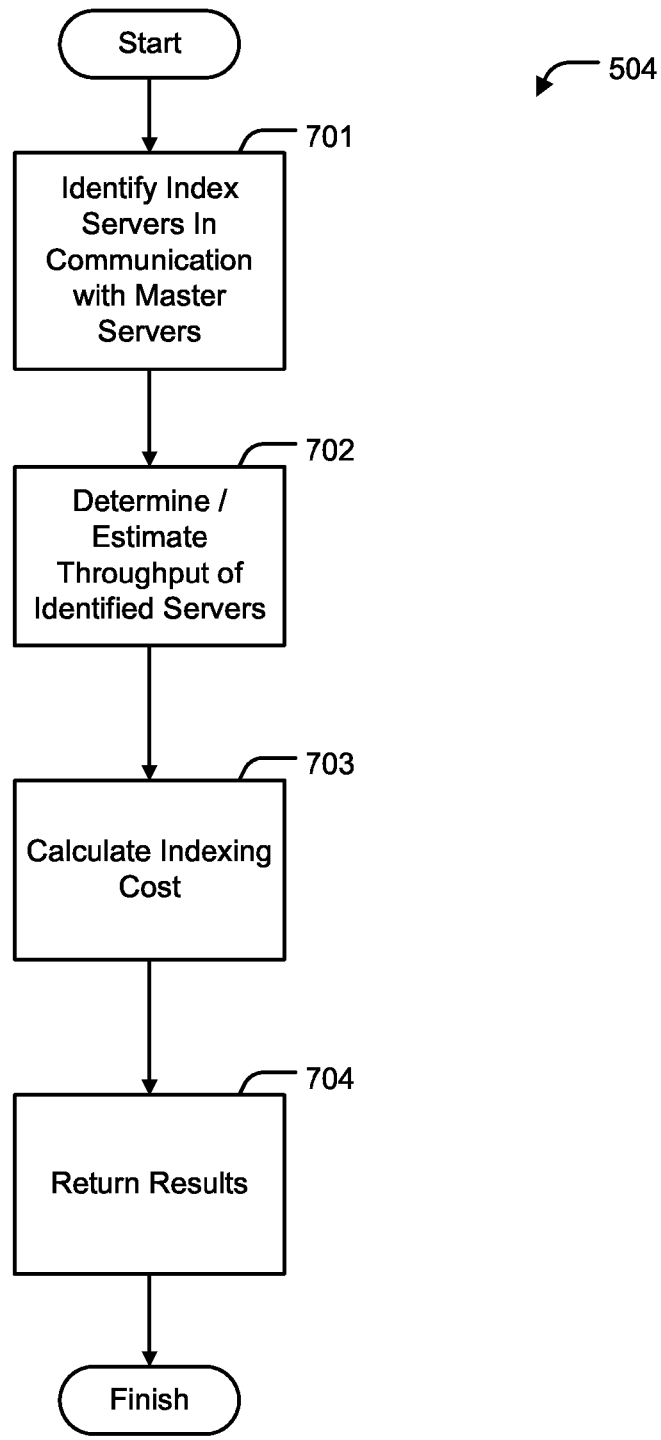
FIG. 7 is a flowchart of a method of determining on-demand data indexing cost, according to an exemplary embodiment of the present invention.

The method 500 further includes determining an indexing cost at operation 503. The determined indexing cost is associated with indexing at least a portion of accessible non-indexed information related to the search query identified at block 502. The indexing cost may take into consideration a plurality of factors, including associated indexing servers connected to a particular master server (e.g., index servers 105, 106, 107) and their associated throughput or computing capacity. For example, FIG. 7 is a flowchart of additional details of operation 503 of determining on-demand data indexing cost, according to an exemplary embodiment of the present invention.

As illustrated, operation 503 includes identifying index servers in communication with one or more master servers associated with a search request at block 701. The one or more master servers associated with a search request may be any of master servers 102, 103, and 104 which control a data catalog associated with the search query, for example, by containing data pertinent to the search. The identified index servers are index servers which are in operative communication with the master servers, or which are available to communicate with the master servers and handle data indexing services.

Thereafter, operation 503 includes determining and/or estimating an indexing capacity and/or throughput of the identified index servers at block 702. For example, an overall throughput of available index servers may be transformed to an indexing cost (e.g., total time to index, loss of computational capacity of backup system, etc) and a set of indexing options associated with the indexing cost (e.g., index all information now, index portion of information now, etc).

Turning back to FIG. 5, the indexing cost and the set of indexing options may be returned at block 504, for example, by displaying the results through a search results report similar to report 400. In response to this report, a user may select and transmit a set of indexing selections such that the same are received at block 505. The indexing selections may include selected indexing options. Thereafter, the method 500 includes indexing at least a portion of accessible non-indexed information based on the selection at block 506.

Figure 8:
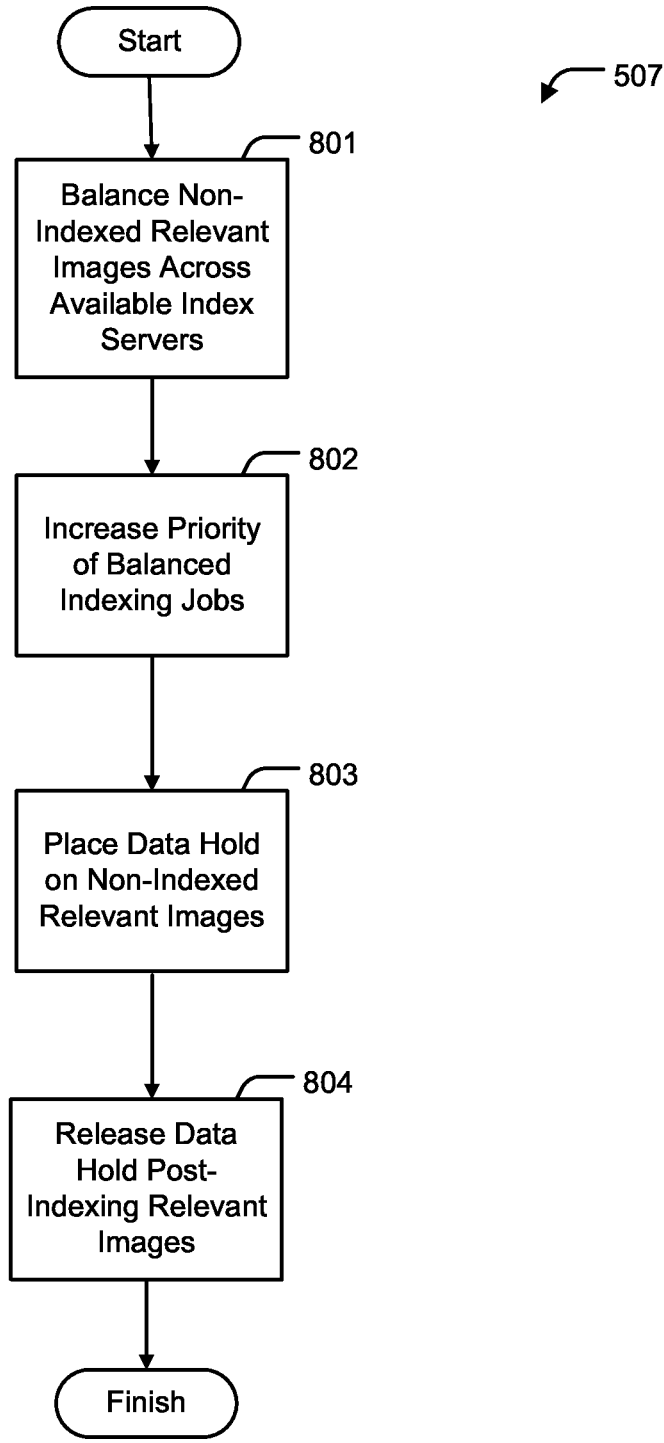
FIG. 8 is a flowchart of a method of indexing data, according to an exemplary embodiment of the present invention.

FIG. 8 is a flowchart of a method 506 of indexing data, according to an exemplary embodiment of the present invention. The method 506 includes balancing non-indexed relevant images across available index servers at block 801. The balancing may be facilitated through any desired load-balancing algorithm, including algorithms taking into consideration individual indexing costs for available index servers. Thereafter, the method 506 includes increasing a priority of balanced indexing jobs at block 802. Increasing priority of the indexing jobs may include identifying the indexing jobs as higher priority than other tasks assigned to the index servers, such that the indexing jobs are taken up and processed prior to other tasks. Thereafter, the method 506 includes placing data holds on non-indexed images to be indexed at block 803, such that these images are protected from manipulation/deletion prior to completion of the balanced indexing jobs. The hold will be lifted post completion of the indexing job at block 804.

The method 500 further includes performing a search of indexed information stored in the data backup system based on the search query at block 507.

Figure 9:
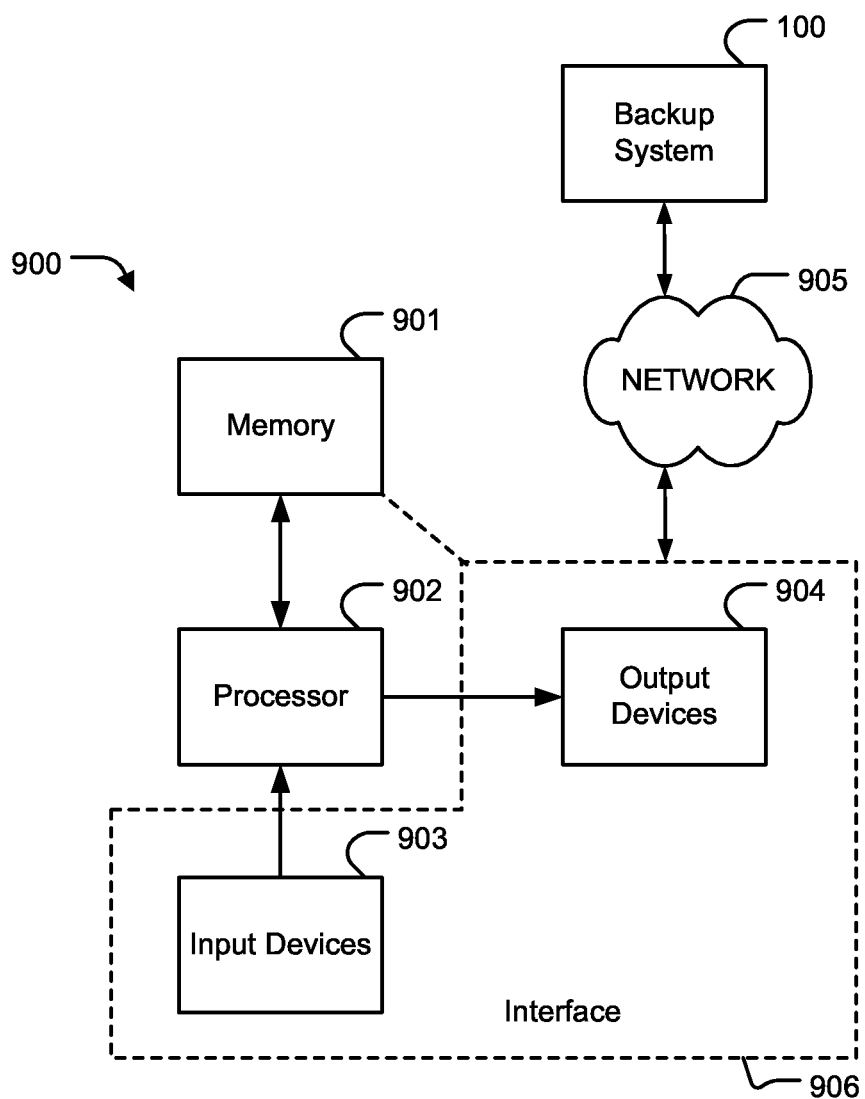
FIG. 9 illustrates a client computer apparatus for implementing an interface for a search user interface module of a data backup system, according to an exemplary embodiment of the present invention.

As described above, methods of searching data on a data backup system may be facilitated through a client computer apparatus. For example, FIG. 9 illustrates a client computer apparatus for implementing an interface for a search user interface module of a data backup system, according to an exemplary embodiment of the present invention.

As shown, the apparatus 900 may be in communication with data backup system 100 over network 905. The network 905 may be any suitable communications network, including the Internet or a distributed computing network for implementing the above methods as a software-as-a-service model. The apparatus 900 may include a memory 901 for storing computer executable instructions executable by processor 902, such that an interface 906 is generated across input devices 903 and output devices 904. The interface may include a web interface, command line interface, graphical user interface, or any suitable interface allowing for communication and interaction with one or more of the elements of system 100. The input devices 903 may include any suitable input devices allowing for relaying information from a user over network 905. The output devices 904 may include any suitable output devices allowing for display of search relevancy information to a user. As information is displayed to a user and responses gathered from a user, the methods described above are facilitated such that they may be implemented as computer-implemented methods for searching with at least a portion being performed by the processor 902.

As also described above, methods of searching data on a data backup system include a plurality of operations facilitated through various computing components of data backup system 100. The results returned include a value or graphical representation of the relevancy of the search results, for example, by identifying a percentage of information related to a search query which has not or cannot be indexed. In this manner, a user may easily identify or portray a confidence value that a particular set of search results may or may not include pertinent information. Example applications for the teachings described above may include legal discovery searches of corporate information, for example, to facilitate discovery requests. Using relevancy information provided by the above teachings, information contained in any set of search results may easily be identified as confidently including a particular percentage of information contained in backup.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A computer-implemented method for performing a search on a data backup system, at least a portion of the method being performed by a computing device comprising at least one processor, the method comprising:
receiving a search query;
performing a search of indexed information stored in the data backup system based on the search query;
determining an overall amount of non-indexed information stored in the data backup system related to the search query; and
returning results of the performing and the determining wherein search results of the indexed information and at least one of a graphical representation of a ratio of non-indexed information to indexed information and a numerical representation of the ratio of non-indexed information to indexed information is displayed.

2. The method of claim 1, wherein:
the search query includes a set of search criteria related to information to be searched; and
the search criteria comprises an identification of at least one networked device of the data backup system and a set or range of dates associated with information to be searched.

3. The method of claim 1, wherein performing the search comprises:
running a search algorithm configured to analyze indexed information stored in the data backup system.

4. The method of claim 1, wherein determining the overall amount of non-indexed information comprises:
querying a target image set related to the search query; and
determining an amount of non-indexed information of the target image set.

5. The method of claim 1, wherein returning the results further comprises:
displaying additional information related to the search, the additional information comprising an identification of non-indexed inaccessible information; and
displaying a set of indexing options associated with the non-indexed information.

6. The method of claim 5, wherein the set of indexing options comprises:
an indexing cost associated with indexing a portion of accessible non-indexed information, wherein the indexing cost comprises a value of computational cost associated with indexing the portion of accessible non-indexed information to increase relevancy of current searches and subsequent searches related to the search query.

7. The method of claim 5, wherein the set of indexing options comprises:
an indexing cost associated with indexing all accessible non-indexed information related to the search query, wherein the indexing cost comprises a value of computational cost associated with indexing all accessible non-indexed information to increase relevancy of current searches and subsequent searches related to the search query.

8. The method of claim 1, further comprising:
determining an indexing cost associated with indexing a portion of accessible non-indexed information related to the search query.

9. The method of claim 8, further comprising:
receiving a selection of indexing options related to the indexing cost; and
indexing the portion of accessible non-indexed information based on the selection.

10. A data backup system, comprising:
at least one master server configured to store backup image information;
at least one indexing server in communication with the at least one master server, the at least one indexing server configured to index at least a portion of the backup image information; and
a search interface module in communication with the at least one master server, the search interface module programmed to:
receive a search query;
perform a search of indexed backup image information stored in the at least one master server based on the search query;
determine a total amount of non-indexed backup image information stored in the at least one master server related to the search query; and
return results of the performing and the determining wherein the search interface module comprises:
an image data collector module configured to retrieve information related to backup image information stored at the at least one master server and to determine the total amount of non-indexed backup image information stored in the at least one master server related to the search query; and
an index server data collector module configured to retrieve information associated with the at least one indexing server and to determine an indexing cost associated with indexing a portion of accessible non-indexed backup image information stored in the at least one master server related to the search query.

11. The data backup system of claim 10, wherein the search interface module further comprises:
a search operation index validator module configured to return the results of the performing and the determining; and
an indexing initiator module configured to initiate indexing of a portion of accessible non-indexed backup image information stored in the at least one master server related to the search query.

12. A non-transitory computer-readable storage medium comprising one or more computer-executable instructions that, when executed by at least one processor of a computing device, cause the computing device to perform a method of search on a data backup system comprising:
receiving a search query;
performing a search of indexed information stored in the data backup system based on the search query;
determining how much non-indexed information is stored in the data backup system as related to the search query; and
returning results of the performing and the determining, wherein returning the results comprises:
displaying search results of the indexed information;
displaying a relevancy of the search results;
displaying additional information related to the search, the additional information comprising an identification of non-indexed inaccessible information; and
displaying a set of indexing options associated with the non-indexed information.

13. The computer-readable storage medium of claim 12, wherein determining how much non-indexed information is stored in the data backup system as related to the search query comprises:
   querying a target image set related to the search query; and
   determining an amount of non-indexed information of the target image set.

14. The computer-readable storage medium of claim 13, wherein the set of indexing options comprises:
   an indexing cost associated with indexing a portion of accessible non-indexed information, wherein the indexing cost comprises a value of computational cost associated with indexing the portion of accessible non-indexed information to increase relevancy of current searches and subsequent searches related to the search query.

* * * * *